May 23, 1939.   M. M. JALMA ET AL   2,159,027

PROCESS AND APPARATUS FOR ROASTING

Filed Aug. 20, 1936

INVENTOR.
MICHAEL M. JALMA
HENRI COUTINHO
BY
*Worth Wade*
ATTORNEY.

Patented May 23, 1939

2,159,027

UNITED STATES PATENT OFFICE 2,159,027

PROCESS AND APPARATUS FOR ROASTING

Michael M. Jalma and Henri Coutinho, New York, N. Y.; said Coutinho assignor to said Jalma Application August 20, 1936, Serial No. 96,940

10 Claims. (Cl. 34—24)

This invention relates in general to roasting and in particular to an improved process and apparatus for roasting coffee, cocoa, cereals, nuts and similar vegetable materials and to correlated improvements designed to enhance the appearance, flavor and odor of the roasted product and to decrease the working hazards in producing the same.

In roasting vegetable materials such as coffee, serious manufacturing difficulties arise in the removal and disposal of the gases given off during roasting. These gases comprise: (1) water in the form of vapor, (2) various aliphatic and aromatic organic compounds resulting from reducing reactions taking place chiefly within the bean, (3) carbon dioxide and oxygen-containing organic compounds resulting from oxidation reactions taking place chiefly on the exterior surfaces of the bean, and (4) carbon monoxide and miscellaneous organic compounds derived from the destructive distillation of the bean and from the burning of the chaff and light trash. A number of the aliphatic and aromatic compounds resulting from the roasting have extremely disagreeable odors and if such gases are permitted to remain within the roasting chamber or are recirculated therethrough, the roasted product acquires such disagreeable odors and acrid tastes. Moreover, a number of the organic compounds and the carbon monoxide are harmful to man, and others such as acrolein are irritants of the mucous membranes. Thus, the roasting gases are frequently an industrial hazard, especially when the roasting is carried out in a room not provided with proper ventilation.

Therefore, it is a general object of the invention to carry out the roasting of coffee, cocoa, cereals, nuts and similar vegetable materials so as to remove and dispose of the roasting gases in a simple and economical manner.

It is a specific object of the invention to provide, in combination with an apparatus for roasting vegetable materials, means for converting the roasting gases to harmless and odorless products.

It is a further specific object of the invention to provide a process for roasting vegetable materials so as to eliminate and dispose of the harmful and malodorous gases resulting from the roasting in such a manner as to avoid contamination of the roasted product and to decrease the working hazards.

Other objects of the invention will in part be obvious and will in part appear hereinafter.

According to the present invention, the roasting of coffee, cocoa, cereals, nuts and similar vegetables is effected by heating the vegetable material to a suitable roasting temperature, continuously withdrawing the gases resulting from roasting and subjecting them while heated to reducing and cracking conditions whereby to simplify the aliphatic and aromatic compounds in the gases, thereafter subjecting the gases to an oxidizing condition whereby to oxidize the gases to harmless and odorless compounds. The apparatus of the invention comprises, in combination, a heated roasting chamber, means to subject the gases derived from roasting to reducing and cracking conditions, means to subject the gases to an oxidizing condition and means to withdraw the gases from the chamber and cause them to pass through such conditions.

The roasting is carried out at a temperature suitable for the particular vegetable material. For coffee, the beans are turned slowly in an atmosphere heated to a temperature of from 300° C. to 425° C. The gases given off by the vegetable material, hereinafter called the "roasting gases", may become mixed with the gases arising from the burning of the fuel gas usually used in heating the roasting chamber. This mixture of gases may be passed through a separator where the chaff is removed.

It has been found that the roasting gases contain certain long chain aliphatic compounds and certain complex aromatic compounds which are difficult to oxidize directly to carbon dioxide. Therefore, the roasting gases preferably are subjected first to an elevated temperature sufficiently high to cause the larger and complex molecules to break down into smaller and simpler molecules which are capable of being oxidized readily to carbon dioxide. For example, the roasting gases are passed through a heated chamber containing comminuted refractory material such as kaolin, clay, pumice, kieselguhr, infusorial earth, crushed brick and the like. For coffee gases, a temperature of about 400° C. or above is suitable. Preferably the quantity of free oxygen admitted to the reducing chamber is limited such that the roasting gases undergo some chemical reduction of the oxygen-containing organic compounds which will assist the breaking down of the larger and more complex compounds. To facilitate this chemical reduction, the refractory material may be impregnated or coated with suitable reducing and cracking catalysts. This chamber is hereinafter called the "reducing and cracking chamber" because the molecules are physically reduced in size and preferably also chemically reduced in oxygen-content.

The simplified gas mixture coming from the reducing chamber is next subjected to an oxidizing condition. For example, the gas mixture is passed through a heated chamber containing comminuted refractory material having the property of promoting the oxidation of the simplified gases. For example, this chamber may be filled with comminuted copper oxide, copper sulphate or copper chloride and the like, which is itself capable of promoting the oxidation, or an inert refractory material, such as pumice, may be coated or impregnated with suitable oxidizing catalysts such, for example, as finely divided platinum, zinc oxide, magnesium oxide and the like.

The gases in the oxidizing chamber are heated to a temperature sufficient to effect the desired oxidation. For copper oxide and coffee gases, a suitable temperature is from 300° C. to 400° C. It is preferred to add to this oxidizing chamber a quantity of preheated oxygen or of an oxygen-containing gas to facilitate the oxidation. In the oxidizing chamber the simplified aliphatic and aromatic compounds are substantially completely oxidized to carbon dioxide and water and the carbon monoxide is converted into carbon dioxide. Thus, the roasting gases are converted into substantially harmless and practically odorless products. Since water vapor is one of the first gases given off in roasting, this serves to reoxidize any copper which has resulted from the reduction of the copper oxide in the oxidation chamber. Therefore, the packing in the reducing and oxidizing chambers operates continuously without reactivation or replenishing.

It is understood that the temperatures required in the reducing and oxidizing chambers will depend chiefly upon the composition of the roasting gases, the time of contact with the refractory material and the nature of the particular material and of the catalyst, if any, which is employed in these chambers, but a suitable temperature may be selected by one skilled in the art following the teachings herein set forth without transcending the invention.

For a more complete understanding of the nature and objects of the invention, reference should be had to the accompanying drawing in which.

Figure 1:
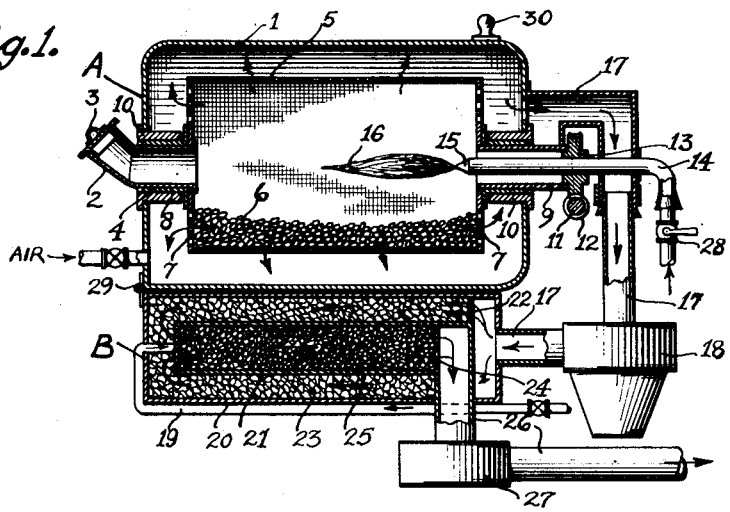
Fig. 1 is a side elevation, partly in section, of one embodiment of the apparatus of the invention especially designed for small batch roasting.

Referring to Fig. 1, there is shown an apparatus comprising in general, a roasting unit A and a gas disposal unit B. The unit A comprises a roasting chamber 1 having an inlet port 2 provided with a cover 3, the port being rotatable in the bearing 4. Within the chamber 1 is a rotatable roasting cage 5 adapted to hold the vegetable material 6 to be roasted, and consisting of a cylinder of wire mesh having perforated metal ends 7 carrying hollow shafts 8 and 9 rotating in the bearings 10 and 10' of the chamber 1. The roasting cage 5 is rotated by means of a driving shaft 11 carrying a worm 12 adapted to engage a worm wheel 13 mounted on the shaft 9 of the cage. The worm wheel 13 has a central orifice through which passes a pipe 14 terminating within the cage 5 in a nozzle 15, the pipe 14 being connected to a supply of fuel gas for heating the roasting chamber by means of the flame 16 produced by the nozzle 15. The chamber 1 is provided with a gas exhaust conduit 17 having a chaff separator 18 which connects with the gas disposal unit B which may be mounted on a suitable stand (not shown).

The purification and disposal unit B comprises two concentric cylinders 20 and 21 which, in this embodiment of the apparatus, are preferably disposed horizontally and form a base for the roasting unit A. The outer cylinder 20 has a perforated end 22 through which the gas from conduit 7 enters. The annular space between the cylinder 20 and the cylinder 21 contains comminuted refractory material 23 and is provided with suitable means (not shown) for heating this material. The inner cylinder 21 having perforated ends 24 contains comminuted material 25 having an oxidizing action on the gases and is provided with suitable means (not shown) for heating this cylinder independently of the cylinder 20. Through one end wall, the cylinder 20 communicates to the exhaust conduit 26 which may be provided with a blower 27.

To regulate the oxygen content of the gases in the oxidizing chamber, preheated oxygen or oxygen-containing gas is supplied to the cylinder 21 by means of a pipe 19 having a suitable valve and disposed so as to be heated by radiation from the cylinder 20 or by other suitable means.

The gas pipe 14 and the exhaust conduit 17 are provided with slip joints at points preferably in line with the worm 12 and the gas pipe 14 is further provided with a valve 28 for cutting off the supply. To provide for discharging the roasted material, the unit A may be affixed to unit B only at the front by a suitable hinge 29, and a suitable handle 30 may be provided on the top at the rear of the chamber 1 whereby this chamber may be elevated. To discharge the load of roasted material, the valve 28 is turned to shut off the fuel gas, the port 3 is rotated to a downward position and the rear end of the unit A is raised by the handle 30 and the load discharged by gravity through the port 3.

In the operation of the apparatus of Fig. 1, the vegetable material 6 is placed in the cage 5 which is rotated while the roasting occurs. The gases resulting from the roasting pass from chamber 1 through the conduit 17 to the separator 18 where the chaff is removed. The gases then pass through the heated comminuted material 23 wherein the larger molecules in the gases are broken down into small molecules and the simplified gases pass next through the heated comminuted material 25 wherein the gases are oxidized as above described, the final products being exhausted through conduit 26, or recirculated as hereinafter described.

Figure 2:
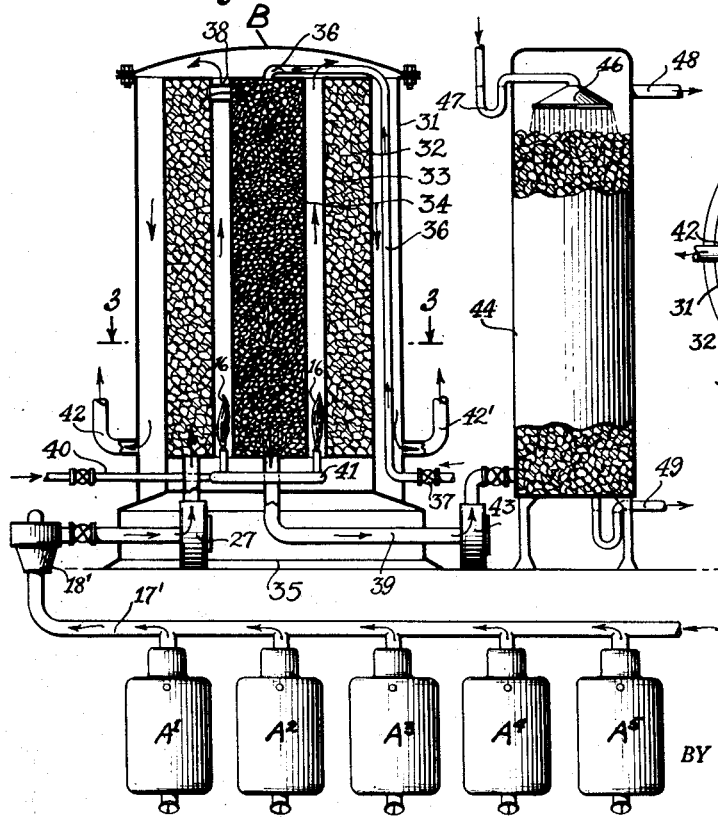
Fig. 2 is a diagrammatic representation, partly in section, of a second embodiment of the apparatus of the invention showing a series of roasting ovens in combination with a single roasting gas disposal unit.

There is shown in Fig. 2 an embodiment of the apparatus of the invention in which the roasting gas from a series of roasting units A', A², A³, A⁴ and A⁵ is treated in a single disposal unit B'. The latter unit comprises, in this embodiment, four concentric cylinders 31, 32, 33 and 34 mounted vertically upon a base 35. The annular space between the cylinders 32 and 33 is filled with a porous comminuted refractory material 23 and constitutes the reducing and cracking chamber, the interior of the innermost cylinder 34 being filled with a comminuted refractory material 25 adapted to effect oxidation of the gases. The gases are withdrawn from the roasting chambers through the conduit 17', the chaff being removed in the separator 18'. The blower 27 disposed in this line 17' forces the gases into the space between cylinders 32 and 33 which contains the refractory material 23. From this space, the gases pass by conduit 38 to the innermost cylinder 34, and flowing downwardly through the oxidizing refractory material 25 therein, is exhausted through the conduit 39. The comminuted materials 23 and 25 in the unit B are heated to the requisite temperatures by suitable means, such as fuel gas flowing through the line 40 terminating in a ring nozzle 41 disposed so that the flames 16 play in the annular space between the cylinders 33 and 34. The products of combustion of the fuel gas rise in the annular space between the cylinders 33 and 34 and flow downwardly in the space between the cylinders 31 and 32 and are exhausted through the ports 42 and 42'. Preheated oxygen or an oxygen-containing gas is supplied to the top of the oxidizing refractory material 25 by means of a pipe 36, having a valve 37 which passes within the space between cylinders 31 and 32 and communicates with the oxidizing chamber 34.

When a single gas purification unit B is used in combination with a series of roasting chambers, it has been found preferable to stagger the operation of the individual roasting chambers so that the composition of the mixed roasting gases from the whole series will be substantially constant.

Figure 3:
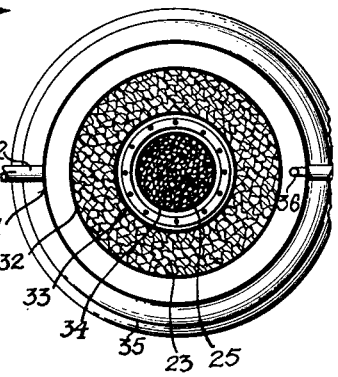
Fig. 3 is a view, in section, of the apparatus of Fig. 2 taken along the line 3—3 thereof.

To cool the purified gases and to reduce the quantity of water and carbon dioxide which would be exhausted from the conduit 39, a suitable scrubber may be employed in combination with the unit B. For example, as shown in Fig. 2, the gases flowing in conduit 39 may be forced by a blower 43 into a cylinder 44 containing a suitable comminuted packing 45 which is kept wet with water from a shower 46 attached to a suitable water line 47 passing it through the top of the cylinder 44. The insoluble gases escape through the exhaust port 47 at the top of the cylinder 44, and the water containing the dissolved gases is led away through the conduit 48 forming a water trap at the base of this cylinder. The operation of unit B in the apparatus of Figs. 2 and 3 is substantially as described with respect to the apparatus of Fig. 1.

The process and apparatus of the invention are applicable for roasting various vegetable materials such as, for example, as coffee, cocoa beans, peanuts, cereals, nuts and similar products and the term "vegetable material" used in the appended claims is used as a generic term to cover such materials. The process of roasting may be continuous or by batch and the apparatus may involve one or several roasting ovens in series.

It is to be understood that the apparatus shown in the drawing is to be considered as illustrating but not as limiting the invention and that various changes and modifications of the apparatus can be made within the scope of the invention to adapt the apparatus and process to the roasting of a particular product. Thus, while the reducing and oxidizing chambers have been shown in the drawing as concentric cylinders, they may be arranged in series or parallel to each other and disposed either horizontal or vertical in any suitable arrangement, and these chambers may be heated and insulated in any suitable manner.

With certain vegetable materials such as cereals and peanuts, it may not be necessary to subject the gases to reducing and cracking conditions before oxidizing them. Therefore, the invention also contemplates that an oxidizing chamber may be used in the process and apparatus without the use of a reducing and cracking chamber for purifying the roasting gases.

If desired to conserve the heat energy of the hot purified gases, part or all of the purified gases may be passed back into the roasting chamber and serve to maintain the temperature of this chamber. For example, in the apparatus of Fig. 1; a second conduit (not shown) may be provided on the blower 17 and may communicate with the chamber 1 at any suitable point. If the roasting gases without purification are recirculated through the roasting chamber, this results in the contamination of the roasted product with sulphur, tar, pyridine and other malodorous compounds, thereby imparting unpleasant aroma and taste to the roasted product. The present invention provides such purification of the roasting gases that the hot purified gases may be recirculated directly through the roasting material without adversely affecting its aroma or taste while utilizing the heat of these gases.

By the present invention, the gases resulting from roasting are rendered substantially harmless and practically odorless by reducing and cracking the larger molecules to smaller molecules and by oxidizing the simplified mixture largely into carbon dioxide and water. The resulting gases are substantially free from gases which are malodorous or which constitute industrial hazards. Therefore, with the present invention, the roasting of vegetable products may be carried out in rooms having no forced ventilation and in plants located in populated districts without causing a public nuisance.

Having described our invention, what we claim as new and desire to secure by Letters Patent is:

1. In a process for roasting vegetable materials, the steps comprising purifying the roasting gases by subjecting said gases to a cracking treatment and thereafter to an oxidizing treatment.

2. In a process for roasting vegetable materials, the steps comprising forceably withdrawing roasting gases from a roasting chamber and passing the roasting gases while hot through a reducing and cracking chamber and thereafter through an oxidizing chamber and recirculating the hot treated gases through the roasting chamber.

3. In a process for roasting vegetable materials, the steps comprising passing the roasting gases over a cracking catalyst at an elevated temperature sufficient to break down the larger molecular structures in the gas to simpler structures and thereafter passing the gases over an oxidizing catalyst heated to a temperature sufficient to substantially completely oxidize the simplified molecular structures.

4. In a process for treating gases resulting from the roasting of coffee, the steps comprising passing the roasting gases through a porous refractory material heated to a temperature sufficient to reduce the larger molecular structures to simplified structures and thereafter passing the gases with sufficient oxygen through a porous refractory material comprising an oxidizing catalyst heated to a temperature sufficient to substantially completely oxidize the simplified structures.

5. In a process for treating gases resulting from the roasting of coffee, the steps comprising passing the roasting gases through a mass of heated refractory material under such conditions as to break down the larger molecular structures to simplified structures, adding oxygen to the gases, passing the simplified gas mixture through a mass of heated copper oxide to substantially completely oxidize the organic compounds to carbon dioxide and water.

6. In an apparatus for roasting vegetable materials, the combination of a heated roasting chamber, a heated cracking chamber, a heated oxidizing chamber and means for passing the roasting gases first through the cracking chamber and thereafter through the oxidizing chamber.

7. In an apparatus for roasting vegetable materials, the combination of a heated roasting chamber, a heated cracking chamber, a heated oxidizing chamber and means for passing the roasting gases first through the cracking chamber and thereafter through the oxidizing chamber, said cracking and oxidizing chambers comprising concentric cylinders connected in series with the roasting chamber.

8. In an apparatus for roasting vegetable materials, means for purifying the roasting gases comprising a heated cracking chamber, a heated oxidizing chamber, and means for forcing the roasting gases through the cracking chamber and thereafter through the oxidizing chamber.

9. In an apparatus for roasting vegetable materials, means for purifying the roasting gases comprising a chaff separator, a heated chamber containing a cracking catalyst, a heated chamber containing an oxidizing catalyst, means for passing the gases over the cracking catalyst to effect simplification of the molecular structures therein and means for passing the simplified gases with sufficient oxygen over the oxidizing catalyst to effect the substantial complete oxidation of the gases.

10. In an apparatus for roasting vegetable materials, means for purifying the roasting gases derived from a plurality of roasting chambers, comprising in series, a chaff separator, a heated chamber containing a cracking atmosphere, a heated chamber containing an oxidizing chamber, a scrubber, and means for forcing the roasting gases through said series.

MICHAEL M. JALMA.
HENRI COUTINHO.